United States Patent Office 3,014,874
Patented Dec. 26, 1961

3,014,874
ALKALINE EARTH HALOPHOSPHATE PHOSPHORS
Peter Whitten Ranby, London, England, assignor to Thorn Electrical Industries Limited
No Drawing. Filed July 20, 1956, Ser. No. 598,990
8 Claims. (Cl. 252—301.4)

This invention is concerned with improvements in luminescent materials for use, for example, in fluorescent discharge lamps, cathode ray tube screens and X-ray screens, and an object of the invention is to provide new luminescent materials.

Luminescent materials have been proposed hitherto comprising alkaline earth halophosphates having the apatite lattice structure and activated with antimony, or lead, or tin, or bismuth, or arsenic, or silver as primary activators. It has also been proposed with such materials to employ manganese as a secondary activator with each of the above-mentioned primary activators. Halophosphates of the apatite lattice structure have the theoretical formula $3M_3(PO_4)_2.MX_2$ where M is a bivalent alkaline earth metal and X is a halogen.

In calculating whether or not a material is within the terms of the claims of this application the weight of the strontium present is first calculated and for the figure thus obtained the weight of a chemically equivalent proportion of calcium is substituted. The calculation is then continued as if the material contained only calcium and not strontium.

According to the present invention there is provided an artificial luminescent material comprising a halophosphate of calcium and/or strontium, having an apatite crystal structure as determined by X-ray analysis, and activated with cerium or with cerium and manganese, the proportion by weight of calcium and/or strontium, phosphorus, and halide in the luminescent material, expressed as phosphorus pentoxide, calcium oxide and calcium halide, being 36–44% of phosphorus pentoxide, 13–50% of calcium oxide, and 11–47% of calcium halide.

Also according to the present invention there is provided an artificial luminescent material comprising a halophosphate as specified in the immediately preceding paragraph, the material including one or more of the alkali metals lithium, sodium and potassium, in the form of a compound or compounds thereof, the proportion of alkali metal present being up to 10% by weight of the material.

Further according to the present invention there is provided a method of making an artificial luminescent material comprising a halophosphate of calcium and/or strontium, having an apatite crystal structure as determined by X-ray analysis, and activated with cerium or with cerium and manganese, the method including the step of heating at a temperature of 900–1200° C. a halophosphate matrix, or a mixture of materials that will yield the halophosphate matrix on heating, together with a compound or compounds of cerium, or of cerium and manganese, such that on heating the cerium, and the manganese, if present, will be incorporated in the matrix as an activator or activators respectively, the proportion by weight of calcium and/or strontium, phosphorous and halide in the luminescent material, expressed as phosphorus pentoxide, calcium oxide and calcium halide being 36–44% of phosphorus pentoxide, 13–50% of calcium oxide and 11–47% of calcium halide.

Yet further according to the present invention there is provided a method of making an artificial luminescent material as specified in the immediately preceding paragraph wherein the said initial mixture includes one or more of the alkali metals lithium, sodium and potassium, in the form of a compound or compounds thereof, the proportion of the alkali metal present being up to 10% by weight of the initial mixture.

We have found that by the addition of one or more of the alkali metals specified the components of the initial mixture appear to react together more readily so that the variations from batch to batch are reduced. Also the powders which are obtained give brighter luminescence with less discolouration of the powders.

Preferably, the proportion by weight of calcium and/or strontium, phosphorus and halide in the luminescent material, expressed as phosphorus pentoxide, calcium oxide and calcium halide is 38–42% of phosphorus pentoxide, 15–48% of calcium oxide and 11–45% of calcium halide.

The proportion of cerium may be between 0.05 and 12.5% of the halophosphate matrix.

Up to 10% by weight of the calcium and/or strontium, calculated as calcium alone, may be replaced by manganese.

Preferably the halide is fluoride or fluoride and chloride.

It has been found by X-ray diffraction analysis that materials in accordance with the invention, and prepared by the method in accordance with the invention, possess the apatite crystal lattice structure, even though their compositions differ widely from the theoretical value for the apatite structure. For example, we have found that a calcium fluorophosphate in accordance with the invention, but not within the preferred range of compositions, and having the theoretical composition of a wagnerite $(Ca_3(PO_4)_2.CaF_2)$, still gives an X-ray diffraction pattern characteristic of an apatite

$$(3Ca_3(PO_4)_2.CaF_2)$$

The luminescence of the cerium activated fluorophosphates appears in the ultra-violet to blue region when the materials are irradiated by short wavelength ultraviolet light, e.g. of 2537 A.U. wavelength. When manganese is incorporated as an additional activator the wavelength of the luminescence is increased.

Materials in accordance with the invention and methods of their preparation in accordance with the invention will now be described, by way of example. The starting materials used should be of the high degree of purity which is recognised in the art as being necessary for such materials.

*Example 1*

44.0 grams calcium hydrogen phosphate $(CaHPO_4)$
33.0 grams calcium fluoride $(CaF_2)$
23.0 grams diammonium hydrogen phosphate

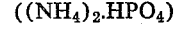
$$((NH_4)_2.HPO_4)$$

5.4 grams ceric oxide $(CeO_2)$
4.8 grams manganese carbonate $(MnCO_3)$ are intimately mixed together and then heated at 1120° C.–1150° C. for ½ hour in a closed silica crucible. When cool the mixture is ground and refired for a further half an hour as before. A third firing may sometimes be necessary. When cool the product emits a bright yellow-pink luminescence when irradiated with 2537 A.U. ultra-violet light.

The material lends itself particularly to use in fluorescent discharge lamps. For example, a sample as prepared above, when used as the phosphor coating in a conventional 4 foot, 40 watt fluorescent lamp gave an efficiency of 50 lumens per watt initially, with a maintenance of efficiency of 96% after 100 hours' running.

Example 2

The method of Example 1 is modified by reducing the amount of calcium fluoride in the initial mixture to 20.65 grams and adding 19.8 grams of strontium fluoride ($SrF_2$) to the initial mixture. The product emits a bright yellow-pink luminescence of a slightly more pink colour than that of Example 1 when irradiated with 2537 A.U. ultra-violet light.

Example 3

If the method of Example 1 is modified by omitting the manganese carbonate, the product shows only a weak blue visible luminescence but emits in the ultra-violet region of the spectrum.

Example 4

59.0 grams strontium hydrogen phosphate ($SrHPO_4$)
53.0 grams strontium fluoride ($SrF_2$)
23.0 grams diammonium hydrogen phosphate $$((NH_4)_2HPO_4)$$

5.4 grams ceric oxide ($CeO_2$)
4.8 grams manganese carbonate ($MnCO_3$)

are intimately mixed together and then heated at 1100° C.–1130° C. for ½ hour in a closed silica crucible. When cool the mixture is ground and refired for a further half an hour as before. A third firing may sometimes be necessary. When cool the product emits a greenish-yellow luminescence when irradiated with 2537 A.U. ultra-violet light.

Example 5

52.5 grams calcium hydrogen phosphate ($CaHPO_4$)
20.4 grams strontium hydrogen phosphate ($SrHPO_4$)
13.7 grams calcium carbonate ($CaCO_3$)
8.7 grams calcium fluoride ($CaF_2$)
26.25 grams ammonium chloride ($NH_4Cl$)
5.4 grams ceric oxide ($CeO_2$)
5.4 grams manganese carbonate ($MnCO_3$)

are intimately mixed together and then heated in a slow stream of hydrogen for half-an-hour at 1080° C. When cool the material is ground and reheated for a further half-an-hour as before. When cool the product is ground, washed with distilled water and dried. The product emits a bright pink luminescence when irradiated with 2537 A.U. ultra-violet light.

Example 6

If the method of Example 5 is modified by adding 0.6 grams of lithium carbonate to the initial mixture the final powder is whiter and the luminescence is slightly brighter.

Example 7

If the method of Example 5 is modified by adding 1.0 gram of sodium carbonate ($Na_2CO_3$) to the initial mixture and carrying out the heating operations at a slightly higher temperature (1080–1100° C.) the final powder is whiter and the luminescence is more orange.

Example 8

If the method of Example 5 is modified by adding 10.0 grams sodium carbonate ($Na_2CO_3$) to the initial mixture and carrying out the heating operations at 1200° C., the final powder is white and the luminescence is bright yellowish under 2537 A.U. irradiation.

Example 9

If the method of Example 5 is modified by adding 5.0 grams sodium chloride (NaCl) to the initial mixture and omitting the ammonium chloride and carrying out the heating operations at about 1150° C., the final powder is white and the luminescence is a bright yellowish under 2537 A.U. irradiation.

Example 10

44.0 grams calcium hydrogen phosphate ($CaHPO_4$)
23.0 grams diammonium hydrogen phosphate $$((NH_4)_2HPO_4)$$

20.3 grams calcium carbonate ($CaCO_3$)
16.0 grams strontium carbonate ($SrCO_3$)
4.8 grams calcium fluoride ($CaF_2$)
6.2 grams strontium fluoride ($SrF_2$)
26.3 grams ammonium chloride ($NH_4Cl$)
5.4 grams ceric oxide ($CeO_2$)
5.4 grams manganese carbonate ($MnCO_3$)

are intimately mixed together and then heated at 1080° C. for half-an-hour in a closed silica crucible. When cool the mixture is ground and reheated for a further half-an-hour as before. Alternatively, the second or third firing may be carried out by heating the material in a slow stream of hydrogen gas at 1080° C. for half-an-hour. When cool the product is ground, washed with distilled water and dried. The product emits a bright pink luminescence when irradiated with 2537 A.U. radiation.

Preferably the atmosphere employed during the heating is not of a strongly oxidising nature, and may be of a reducing nature. As is well known to those skilled in the art starting materials other than those specifically referred to above can be employed.

I claim:

1. An artificial luminescent material comprising a halophosphate of at least one metal selected from the group consisting of calcium, strontium and mixtures thereof, having an apatite crystal structure as determined by X-ray analysis and having incorporated therein an activator selected from the group consisting of cerium and both cerium and manganese together, wherein the proportions by weight of ascertainable calcium and ascertainable strontium expressed collectively as calcium oxide is 13 to 50% and the phosphorus expressed as phosphorus pentoxide is 36 to 44% and the halide expressed as calcium halide is 11 to 47%.

2. The luminescent material according to claim 1, further including at least one alkali metal compound selected from the group consisting of lithium, sodium and potassium, wherein the proportion of alkali metal present is up to 10% by weight of the material.

3. The luminescent material according to claim 2 wherein the proportion of cerium is between 0.05% to 12.5% of the halophosphate matrix.

4. The luminescent material according to claim 3 wherein less than about 10% by weight of the ascertainable calcium and ascertainable strontium present expressed collectively as calcium oxide is replaced by manganese.

5. A method of making an activated alkaline earth halophosphate phosphor wherein the alkaline earth metal is a member selected from the group consisting of calcium, strontium and mixtures thereof and wherein the activator is a member selected from the group consisting of cerium and cerium and manganese together and wherein said phosphor has an apatite crystal structure as determined by X-ray analysis, said method comprising: heating at a temperature of 900 to 1200° C. a mixture of materials selected from the group consisting of a halophosphate and materials which yield a halophosphate upon heating, together with an activator which is a compound of a metal selected from the group consisting of cerium and cerium and manganese together, such that upon heating said activator will be incorporated into said alkaline earth halophosphate crystal structure, the proportion by weight of said alkaline earth metal, phosphorus and halide expressed as calcium oxide, phosphorus pentoxide and calcium halide respectively being 13 to 50% calcium oxide, 36 to 44% phosphorus pentoxide and 11 to 47% calcium halide.

6. The method according to claim 5 wherein there is included in the initial mixture at least one compound of an alkali metal selected from the group consisting of lithium, sodium, potassium and mixtures thereof, the proportion by weight of the alkali metal in the initial mixture being up to 10%.

7. The method according to claim 6 wherein the proportion of cerium is between 0.05 and 12.5% of the halophosphate matrix.

8. The method as in claim 7 wherein up to 10% by weight of the alkali earth metal, calculated as calcium alone is replaced by manganese.

References Cited in the file of this patent

UNITED STATES PATENTS

| | | |
|---|---|---|
| 2,241,951 | Huniger | May 13, 1941 |
| 2,306,567 | Roberts | Dec. 29, 1942 |
| 2,575,755 | Froelich | Nov. 20, 1951 |
| 2,664,401 | McKeag | Dec. 29, 1953 |
| 2,765,281 | Chrien | Oct. 2, 1956 |
| 2,772,241 | Ranby | Nov. 27, 1956 |

FOREIGN PATENTS

| | | |
|---|---|---|
| 156,966 | Australia | June 8, 1954 |